United States Patent [19]

Balding

[11] 4,097,892
[45] Jun. 27, 1978

[54] VIDEO COLOR FILM ANALYZER

[76] Inventor: George H. Balding, 252 West-1300 South, Salt Lake City, Utah 84115

[21] Appl. No.: 730,737

[22] Filed: Oct. 8, 1976

[51] Int. Cl.² .............................................. G03F 3/08
[52] U.S. Cl. ...................................... 358/80; 358/76
[58] Field of Search ..................... 358/75, 76, 80, 54

[56] References Cited

U.S. PATENT DOCUMENTS

| 3,450,830 | 6/1969 | Kyte | 358/80 |
| 3,674,364 | 7/1972 | Korman | 358/76 X |
| 3,942,154 | 3/1976 | Akami et al. | 358/78 X |

Primary Examiner—Richard Murray
Attorney, Agent, or Firm—Emrich, Root, O'Keeffe & Lee

[57] ABSTRACT

A video color film analyzer including scanning apparatus, employing a flying spot scanner, dichroic mirrors and photomultipliers for scanning a color film and providing green, blue and red video signals representing color composition of the film, and computer circuit for processing the three color video signals over separate computer sections to provide video drive signals to a TV monitor to effect the display of a positive reproduction of the film, the computer sections having a common density control and individual color controls which are adjustable to vary the density and color balance of the displayed picture, and a numeric generator circuit which responds to control outputs of the density and color controls to effect the video display of numerics on the monitor screen, indicating the settings of the controls, for use in setting up a printer for the reproduction of a color negative to a color print.

25 Claims, 11 Drawing Figures

TIMER 58

PEAK VIDEO DETECTOR 60

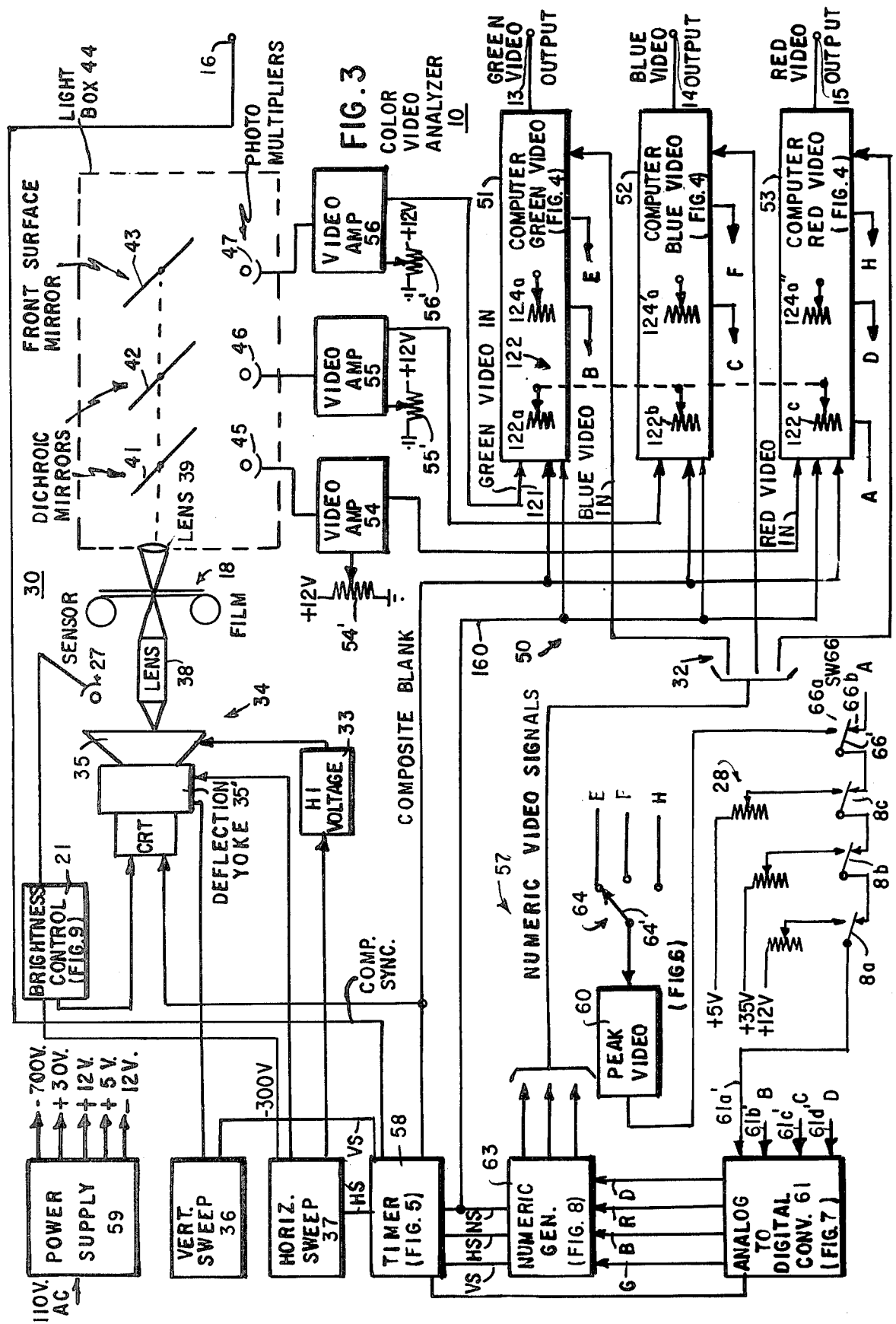

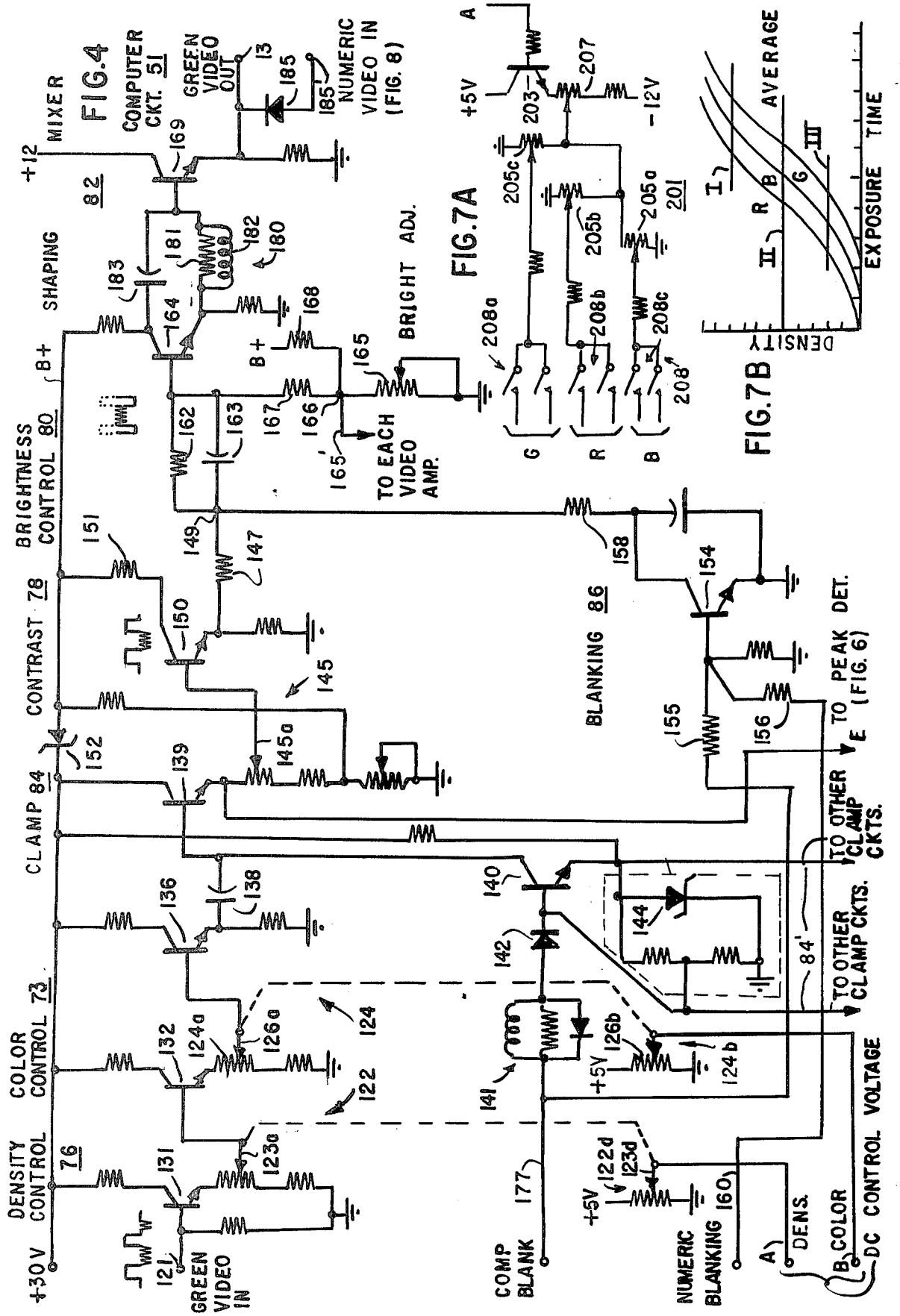

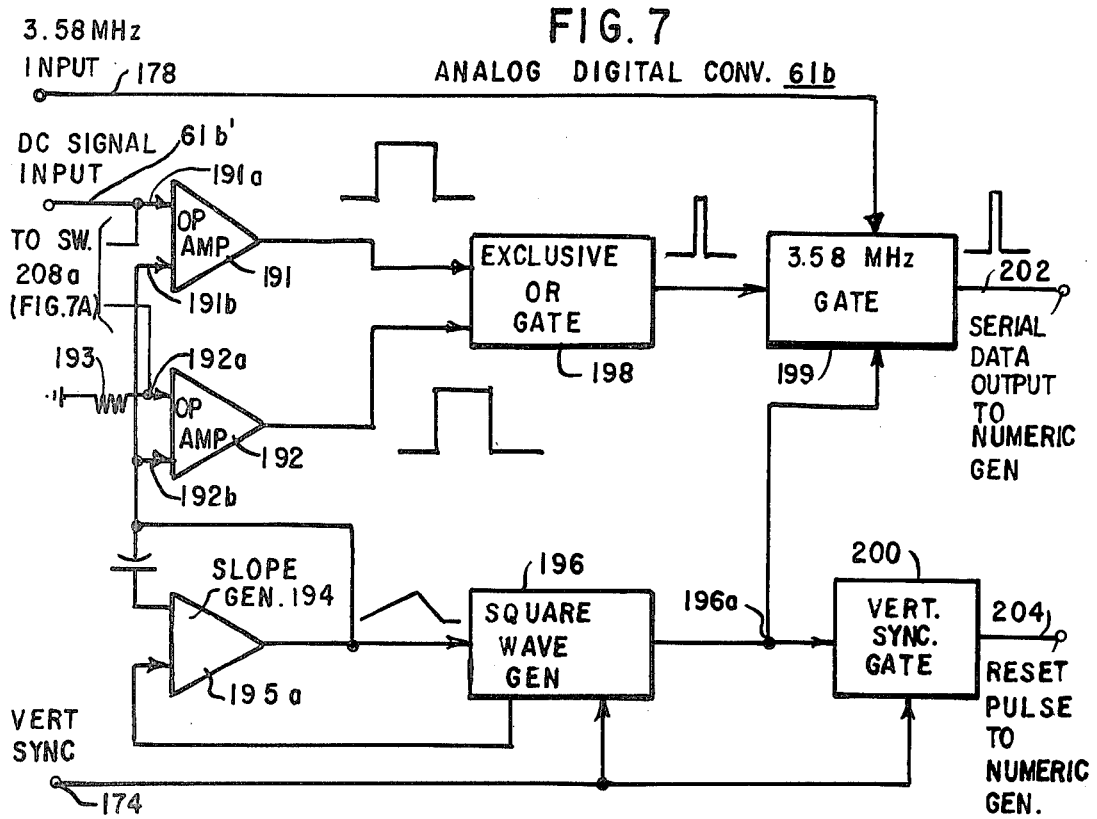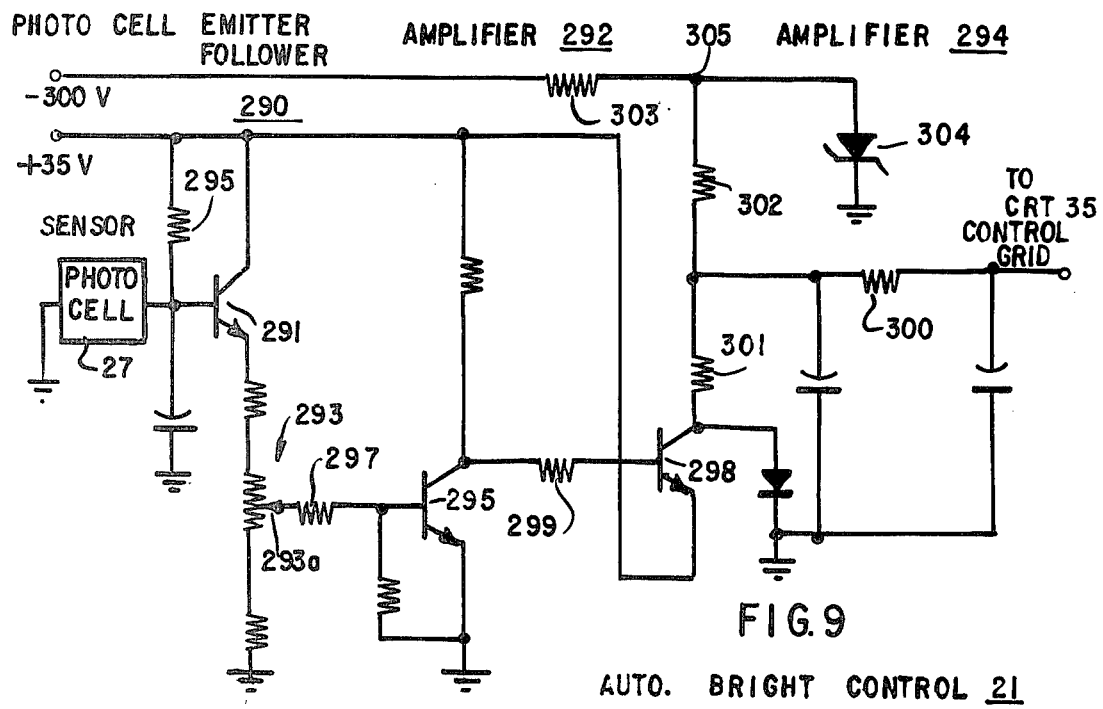

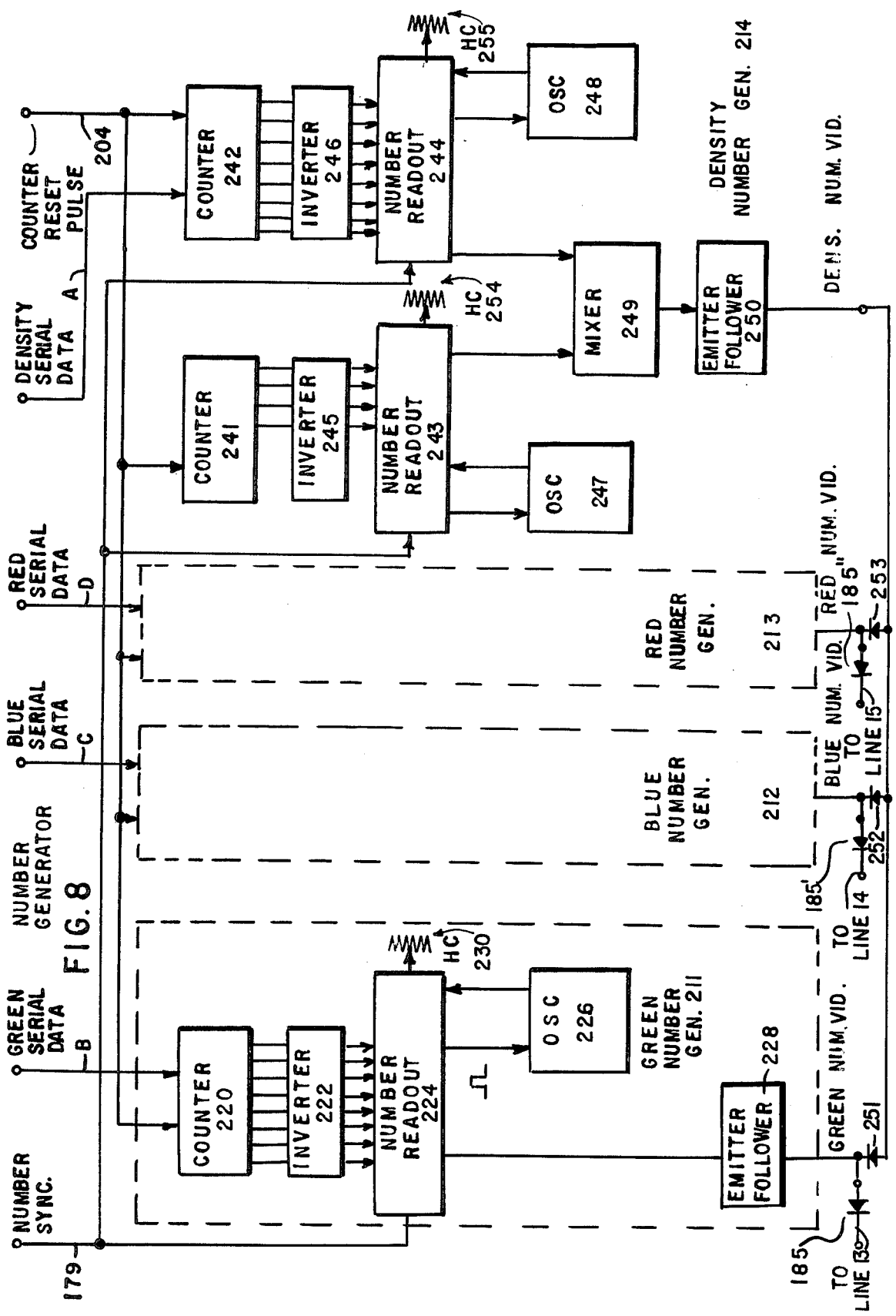

4,097,892

VIDEO COLOR FILM ANALYZER

BACKGROUND OF THE INVENTION

1. Field of the Invention

This invention relates to apparatus for use in photographic print reproduction, and more particularly to a video color film analyzer for providing a video reproduction of a color film to permit evaluation of the film before printing.

2. Description of the Prior Art

In the field of photographic print reproduction, evaluating colored negatives before printing has proven to be a very vexing problem in that the colors and density of the negative are reversed from those of the final prints. For instance, greens on the print will appear red on the negative, and blues on the print will appear yellow on the negative.

During the printing process, the technician has to provide the proper amount of red, blue and green light to expose the print from the negative. Generally, the technician has to make an educated guess as to the settings, in trying to determine whether the print will turn out to be an acceptable reproduction of the negative.

Photo tube systems are sometimes used to measure the amount of light which is projected through the negative, while printing and controlling the amount of time that the red, blue and green light projects through the negative. However, in such systems, the overall light is measured instead of individual colors, and thus, such systems are not very accurate. The use of phototube systems generally result in only about 30% useable prints on the first try, which requires the photo technician to change the settings of the printer and repeat the printing process for bad prints until acceptable prints are obtained. Such repeat processing results in considerable loss in time as well as waste of paper and chemicals which results in increased costs to the consumer.

To further try to overcome this problem, there has been developed Video Color Negative Analyzers, which view the negative with a TV camera and invert the colors of the image while presenting the picture on a TV screen to the operator. One known system employs rotating color wheels to determine color content of a negative and for providing a colored reproduction of the image on a monitor. These systems have proven to be a step forward but they are mostly electro-mechanical and large in nature and extremely costly to the user. Also, the operator must be very capable and experienced in setting up the systems to get the color and density settings as accurate as may be required to provide the printer equipment with the data required to obtain acceptable prints.

SUMMARY OF THE INVENTION

The present invention has provided a video color film analyzer for detecting and measuring the density and color of a film and for effecting the display of a positive reproduction of the film on a monitor, to permit evaluation of the film prior to printing.

The film analyzer unit includes a film scanning means which scans the film and provides video signal outputs corresponding to the green, blue and red color composition of the film, a computer means which responds to the video signal outputs to provide drive signals for a monitor, which may be a color TV monitor, and a timing means which synchronizes the operation of the scanning means, the computer means and the monitor.

The computer means includes density and color adjust controls which permit the operator to adjust the density and color balance of the picture displayed on the monitor.

In accordance with the present invention, the film analyzer unit further includes numeric generator means which responds to control outputs of the computer means, indicative of the density and color levels for the film being analyzed, to effect the display of numerics on the monitor, superimposed on the picture of the film being viewed, and thus in the line of sight with the displayed picture. The numerics provide the user with a visual indication of the color composition of the film and provide data which is used in the setup of a film printing apparatus when the film is printed.

More specifically, the film scanning means comprises a flying spot scanning means which projects a moving beam of light through the film. The beam of light, after passing through the film is separated into red, blue and green components through the use of dichronic mirrors, and a front surface mirror, the separate color components of the light beam being directed to individual photomultipliers which convert the red, blue and green light to color video signals over three signal channels for application to the computer means.

As a film is being scanned by the scanning apparatus, the resultant green, blue and red color video signals are extended over the corresponding signal channels of the computer to the monitor, along with a composite sync signal provided by the timing means and numeric video signals provided by the numeric generator means to effect the display of a reproduction of the film image on the monitor screen, with the numerics superimposed on the displayed picture.

The computer means includes three computer circuits, one for each color channel. The density control, which is common to all three computer circuits, enables adjustment of the amplitude of the color video signals to obtain the desired color density in the viewed picture. The density control also provides a control signal for the numeric generator means to effect the display of numerics representing the setting of the density control.

Each of the computer circuits includes an individual color control which enables adjustment of the amplitude of the video signals to obtain the desired color balance in the viewed picture. Each color control provides a control signal for the numeric generator means to effect the display of numerics representing the settings of the color controls.

The computer controls are initially adjusted to cause the numerics to read preselected values when a standard negative is being scanned by the film scanning means. This provides reference values for use in the processing of unknown films.

As each unknown film is being evaluated, the computer controls are adjusted to provide the desired density and color balance for the picture displayed on the monitor screen. In accordance with the present invention, this is done by monitoring the peak values of the color video signals and using the peak values to effect the display on the monitor of numerics corresponding to the peak values of the video signals. The computer controls are then adjusted until the numerics displayed indicate the reference values obtained through the use of a standard negative.

When the density and color controls are thus adjusted, the numerics displayed represent density and color settings for use in setting up the printing apparatus. The use of reference values to aid in ajusting the computer controls, and the numeric display of such reference values on the monitor screen while the computer controls are being adjusted removes the burden of judgment and color interpretation from the operator, and permits unskilled persons to operate the analyzer unit.

Also, the color picture and the numerics are displayed on a large screen, which in one case measured 12 inches diagonally, providing a larger picture for viewing by the operator. In addition, the numerics representing the settings of the color controls are displayed in the colors they represent thereby minimizing the chance of incorrect recording of the data for use in setting up the printer.

In accordance with a feature of the invention, signal levels at internal test points, which may be supply voltage levels, may be extended to the numeric generator means which converts such signal levels numeric video signals, permitting numerical display of the signal levels on the monitor screen providing a self-test capability to the analyzer.

Further features relate to a reference means, common to all three computer circuits, which provides a common DC output reference for the video signals in each signal channel, and contrast and brightness controls in the computer means which are adjustable to control the contrast and brightness of the displayed picture.

In accordance with a further feature, the numeric generator means includes a slope control means which permits adjustment of the color numerics in relation to density. This enables compensation for the nonlinearity in printing times for the colors red, blue and green for a given printing paper.

The film analyzer unit of the present invention employs solid state circuits for processing the video signals provided by the film scanning apparatus. Also, the use of dichroic mirrors in the film scanning apparatus to separate the light beam projected through the film into red, blue and green components, obviates the need for rotating color filters or the like, which would result in added cost and increased size for the analyzer unit.

DESCRIPTION OF THE DRAWINGS

FIG. 3 is a block diagram of the video color film analyzer provided by the present invention;

FIG. 4 is a schematic circuit diagram of one of three identical computer circuits of the film analyzer shown in FIG. 3;

FIG. 7 is a block diagram of one of four analog-to-digital converter circuits of the film analyzer;

FIG. 7A is a schematic circuit diagram of a slope control circuit of the analog-to-digital converter;

FIG. 7B shows the relationship of color density versus exposure time for a given paper;

FIG. 8 is a block diagram of a numeric generator of the film analyzer; and,

FIG. 9 is a schematic circuit diagram of an automatic brightness control circuit of the film analyzer.

DESCRIPTION OF A PREFERRED EMBODIMENT

General Description

Figure 1:
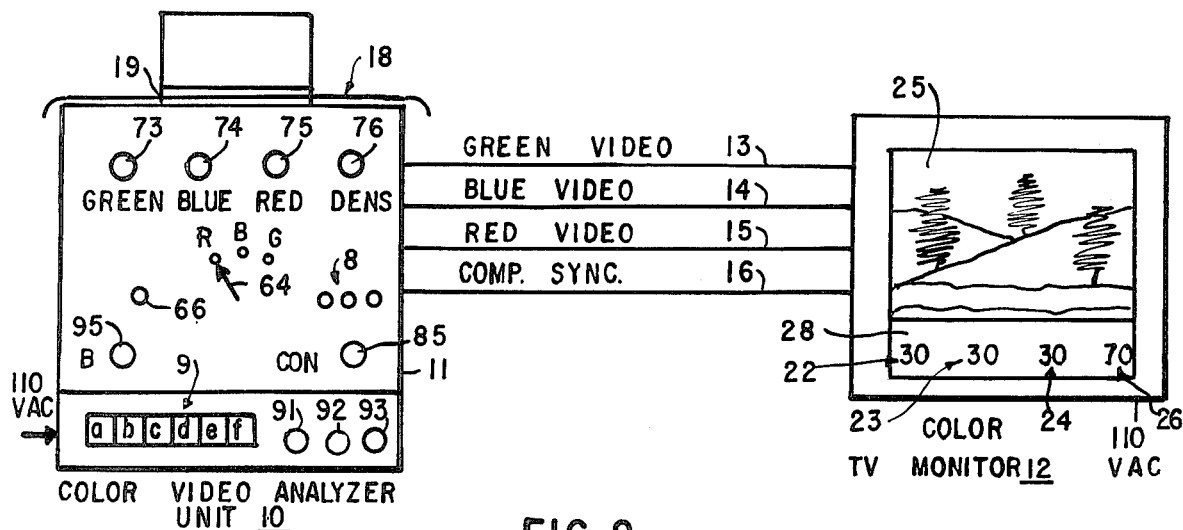
FIG. 1 is a simplified representation of a video color film analyzer provided by the present invention, shown connected to a monitor.

Referring to the drawings, FIG. 1 is a simplified representation of a color film analyzer unit 10 provided by the present invention, which is shown connected to a display unit 12, embodied as a color TV monitor having separate red, green and blue inputs. The analyzer unit 10 may be used in the process of photographic print reproduction to permit the evaluation of color negative films before printing. The analyzer unit 10 effects the display of a video color reproduction of the film on the monitor, and enables the operator to visually color correct the displayed video image until the displayed image has the color desired in the reproduction.

The film 18 to be analyzed is placed in a film slot 19 of the housing 11 of the analyzer unit 10. The analyzer unit 10 includes an optical film scanning apparatus 30, shown schematically in FIG. 3, which is mounted in the housing 11 and is operable to scan the film 18 placed in the slot 19 and provide outputs indicative of the color composition of the film image to electronic circuitry 32, shown in block form in FIG. 3, which is also mounted in the housing 11 of the unit 10. The electronic circuitry 32 provides color video signals over separate signal channels and a composite sync signal which are extended to the monitor 12 over conductors 13–16, providing the operator with an exact color positive visual reproduction of the film image on the TV screen.

In accordance with the present invention, the analyzer unit 19 also generates numeric video signals, indicating the proportionate quantities and density of the colors, which are extended to the monitor 12 for providing a numerical display of such information. For example, the numerics indicated at 22, 23 and 24 displayed on the screen 25 of the monitor 12 indicate the proportionate quantities of green, blue and red colors in the viewed picture. The numerics indicated at 26 represent the density of the colors. The numerics 22, 23, and 24, which indicate proportionate quantities of the colors green, blue and red are displayed in the corresponding colors, green, blue or red. The density numerics 26 appear white. All four sets of digits overlay a black band 28 across the bottom of the screen 25. Such information provides the user with a visual indication of relative color levels, for use in adjusting the settings of a printing apparatus.

The novel system includes controls which permit even the inexperienced operator to provide constant processing results. The color density is adjustable by way of a color density control 76, shown in FIG. 1, and the color levels are individually adjustable by way of color controls 73, 74 and 75 associated with green, blue and red color channels, respectively. The density and color controls enable modification of the video signals provided to the monitor 12 in correspondence color and density modification of the displayed picture as desired by the operator. As the operator adjusts the color or density levels, the corresponding numerics also vary to indicate the change. The analyzer unit 10 also includes a brightness control 95 and a contrast control 85 for modifying the brightness and contrast of the picture viewed on the screen 25 of the monitor.

For the purpose of providing compensation for different types of films, film select switches 9e–9f are individually operable to provide different gains for video amplifiers 54–56 (shown in block diagram form in FIG. 3), which are connected in the red, blue and green video signal channels, respectively. Film select switches 9a–9e are operable to provide five fixed gains for the video amplifiers, and film select switch 9f is operable to connect variable gain controls 91–93 into the amplifier gain control networks, affording variable gain adjust for the amplifiers. The gain controls 91–93 are also used in setting up the analyzer prior to use.

In setting up the analyzer unit prior to use, a standard film is scanned and the color video signals in each signal channel are sampled and displayed on the monitor 12 as numerics 26, and the density controls 91–93 are adjusted until the numerics read preselected values, for the density reading to which the operator wishes all prints to be printed to.

More specifically, prior to scanning the standard film, the color controls 73–75 and the density control 76 are set to provide readings of 30 for each of the color numeric groups 22–24 and a reading of 70 for density numeric group 26. Such values are typical readings for a standard film from Eastman Kodak. The density reading 70 is the number to which the gain controls 91–93 are adjusted while individually selecting the red, blue and green video signals by way of select switches 64 and 66. That is, with the standard film in the analyzer, switch 64 is operated to select one of the colors, such as red and then swtich 66 is operated causing the peak value of the red video signal to be displayed as numerics 26. The gain control 93 is then adjusted to obtain a reading of 70. The blue and green video signals are then selected, individually, and gain controls 92 and 91 are adjusted as the corresponding color video signal is selected, to provide readings of 70. After gain controls 91–93 have been thus adjusted, the analyzer unit is set up for evaluating unknown films.

In evaluating unknown films, the density control 76 and the color controls 73–75 are adjusted to the reference values established by the standard film. More specifically, with an unknown film in the film slot 19, one of the color video signals, such as the red video signal is selected by operating switches 64 and 66, causing the peak value of such signal to be displayed as numerics 26. The density control 76 is then adjusted until the reading is 70. This establishes the density reading for the printing apparatus. The peak values of the blue and green video signals are then selected individually, and the associated color controls 74 and 73 are adjusted to obtain readings of 70 on numeric group 26. When switch 66 is released, the density number, displayed as numeric group 26, and the color numbers displayed as numeric groups 22–24 provide the data needed in establishing the desired settings for the printing apparatus.

Using this system gives consistent reproductions of density and does not depend on the judgment of the individual. The setup of the density control 76 automatically sets up the amplitude of the video signals into all three signal channels after which only adjustment of the color controls is required. When the color controls are set to give equal readings, it has been found to give consistent reproduction of accurate color data with no color interpretation required. Thus, persons unskilled with color analysis can easily operate this color video analyzer unit 10. Moreover, is has been found that the rate of success of first prints was approximately 85%, representing a large savings in paper, chemicals and labor along with an increase in quality of the final prints.

The analyzer unit 10 further includes select switches 8 which permit signal levels to internal test points to be displayed on the monitor 12 as numerics 26. By way of example, such signal levels may be power supply voltages for the analyzer unit 10.

Analyzer Unit

Referring to FIG. 3, the film scanning apparatus 30 of the analyzer unit 10, which is embodied as a flying spot scanner 34, includes a CRT 35 which provides a moving spot of light on its face, a lens system, including a lens 38 and a lens 39, and a color separation apparatus 40 including a pair of dichroic mirrors 41 and 42, a front surface mirror 43, and photomultipliers 45–47.

The film scanning apparatus 30 scans the film 18 and provides green, blue and red video signals corresponding to green, blue and red color content of the film over three separate signal channels.

The electronic circuitry 32 includes a computer section 50, including separate computer circuits 51–53 for each of the three color channels, which provide the drive signals for the monitor 12 and permit adjustment of the video signal levels as desired by the operator, a signal processing circuit 57 which responds to outputs of the computer circuits 51–53 to generate the numeric video signals to effect the display of the numerics 22–24 and 26 on the monitor 12, a timer circuit 58 which provides blanking and sync pulses for the analyzer unit 10 and the monitor 12, a brightness control circuit 21 for maintaining regulated light output of the CRT 35, and a power supply circuit 59 which provides operating voltages for the analyzer unit 10.

(a) Film Scanning Apparatus

Referring to the film scanning apparatus 30, a flying spot scanner 34 is shown which includes a vertical sweep circuit 36 and horizontal sweep circuit 37 for providing deflection voltages to the deflection yoke 35' of the CRT 35 under the control of vertical and horizontal sync pulses provided by the timer circuit 58. The horizontal sweep circuit 37 also drives a high voltage power supply 33 which provides 25kv to the anode of the CRT 35. As the film scanning apparatus 30 is energized with the operation of a power switch (not shown), the flying spot scanner operates in a conventional mode to move the CRT beam across the face of the CRT in a raster pattern at the horizontal rate of 15,750 Hz and the vertical rate of 60 Hz.

The moving spot on the face of the CRT 35 is focused on the color film 18 by lens 38. The area of the film analyzed may typically be 45 × 45 mm. Lens 38 is adjustable to cover a larger or smaller area of the film 18 as desired. The moving spot of light after passing through the film 18 is collimated by lens 39 and directed into a light tight box 44 in which are mounted the dichroic mirrors 41 and 42, the front surface mirror 43, and the photomultiplier tubes 45–47, which separate the three basic colors from the light beam projected through the film 18. Dichroic mirror 41, which may be the type 21-91058-1 (red), commercially available from Sylvania Electronics, reflects the red light into photomultiplier 45. The remaining blue and green light after passing through dichroic mirror 41 is directed to dichroic mirror 42, which may be the Sylvania Type 21-91058-2(blue), which reflects the blue portion of the light towards photomultiplier 46. The remaining green light passes through dichroic mirror 42 to front surface mirror 43 which reflects the light to photomultiplier 47.

The photomultipliers 45–47 convert the red, blue and green light to electrical signals having amplitudes related to the amount of red, blue and green light of the light beam passing through film 18. The red, blue and green video signals provided at the outputs of the photomultipliers 45–47 are passed over video signal amplifiers 54–56 to inputs of the computer circuits 51–53, respectively.

The gains of the video amplifiers 54–56 are adjustable to compensate for different film substrates.

As described above, variable gain controls 91–93 (FIG. 1) may be switched into the amplifier gain networks by operating switch 9f, permitting variable adjustment of the gains of the video amplifiers 54–56. The gain controls 91–93 include potentiometers 54'–56' which permit adjustment of the gains during setup of the analyzer unit until the desired density setting is obtained for a given standard film. The potentiometers 54'–56' are set to establish reference signals at their wipers during setup while a standard film is being processed, the reference signal being maintained or registered for use in processing unknown films. The switches 9a–9e permit different fixed resistors to be switched into the gain control networks in place of potentiometers 54'–56' for providing predetermined reference signals which establish the proper density settings for the unit 10 for different known types of film. The video amplifiers 54–56 may include inverters connectable into the video signal paths for inverting the signals supplied to the computer circuits to enable positive films to be analyzed.

(b) Computer Circuit

The computer circuits 51–53 (shown on block in FIG. 3) include the color controls 73–75 and the density control 76 which permit the user to adjust the color and density of the picture displayed, each control as operated selectively adjusting the amplitude of the green, blue and red video signals which are extended to the monitor 12 over conductors 13–15 to thereby change the tint of each color to obtain a desired color balance. The density control 76, common to all circuits 51–53, permits adjustment of the amplitude of the color video signals for modifying the color density of the displayed picture to a desired density. The color and density controls vary proportionate quantities of green, blue and red in the picture displayed on the monitor 12 by controlling the amplitude of each of the video signals output by the film scanning apparatus 30 in amounts which represent the color and density presentation of the film 18 desired by the operator.

The density control 76 comprises a four-gang potentiometer 122 of which three sections 122a–122c are used to simultaneously control all three color channels, and the fourth section 122d (shown in FIG. 4) of which provides a variable voltage at output A indicative of the setting of the density control potentiometer. The color controls 73–75 each comprise a double-gang potentiometer having first sections, such as section 124a for color control 73, which control the amplitudes of the video signals provided over the separate signal channels of the computer circuits 51–53, and having a second section, such as section 124b for color control (shown in FIG. 4), which provide variable voltages at outputs B, C and D of computer circuits 51, 52 and 53, respectively, indicative of the settings of the color controls. The specific circuit details and operation thereof are set forth hereinafter.

The variable voltages output from the potentiometers are extended over outputs A–D to the signal processing circuit 57 for use in the generation of numeric video signals which effect the display of the numerics 22–24 and 26 on the display monitor 12.

(c) Numeric Generator Circuit

The signal processing circuit 57, shown in block in FIG. 3, includes a peak video detector 60, an analog-to-digital converter 61 and a numeric signal generator 63 which are shown in detail in FIGS. 6–8, and described more fully hereinafter. During use of the color analyzer to produce displays on the monitor 12 of the picture being processed, the variable signals representative of the settings of color controls 73–75 are provided by the computer circuits 51–53 over putputs B–D are extended to inputs 61b'–61d' of the A/D converter 61 for conversion to digital signals. The signals representing the density setting output over output A of the computer circuit is fed over switch 66 in a first position to an input 61a' of the A/D converter 61 for conversion to a digital signal.

The digital signals output from the A/D converter 61 for each of the colors are in turn extended over the green, blue, red output leads to control the numeric signal generator 63 to provide numeric video signals representative of the density and color settings in a manner to be described hereinafter. The numeric video signals output over conductor 32 by the numeric signal generator 63 are mixed with the video color signals at the outputs of the computer circuits 51–53 for transmission to the TV monitor 12 and presentation at positions 22, 23, 24, 26, respectively on the number strip.

An important feature of the invention is that measurement of the density of each of the colors red, blue and green is effected by means which separates the colors and provides video signals in separate signal channels which are representative of the color densities, and by detecting and measuring the peak value of the video signals for the separate color channels. To this end, computer circuits 51–53 provide the video signals on outputs E, F and H of the computer circuits 51, 52 and 53, respectively, to the peak detector 60. Switch 64 selects the desired color channel, and switch 66 connects the output of the peak detector 60 to the input 61a' of the A/D converter 61. Switch 66 normally connects the density control 76 at output A of the computer section 50 to the A/D converter 61.

Switch 66 is used to select either the peak video signal or the density control voltage which is used to control numeric group 26, (FIG. 1) to the A/D converter 61. The peak detector 60 also may receive video signals through switch 64 which selects either the red, blue or green video signals for measurement. The numeric video signals provided by the numeric generator 63 not only represent the position of the computer controls but also indicate voltage amplitudes from the peak detector 60 for setting up the computer controls by adjusting the controls to a preselected level as indicated by numerics 26. The peak detector 60 can also be used to setup the photomultiplier controls 54'–56' by setting them to a preselected value readout on numeric group 26 as described above. The peak video detector 60 is also used to setup the density control of the computer section 50, thereby calibrating the gain for each video amplifier while the individual controls 73–76 are set at their nominal settings (30—30—30-70 in the present example).

Timer Circuit and Power Supply

The other elements of the electronic circuitry 32 (FIG. 3) include the timer circuit 58 and the power supply circuit 59. The timer circuit (FIG. 5) provides vertical sync signals at a 60 Hz rate and horizontal sync signals at the 15,750 Hz rate for synchronizing the horizontal and vertical sweep of the monitor 12 with that of the flying spot scanner 34 in the analyzer unit 10. The timer circuit 58 also provides composite blanking signals for blanking the flying spot CRT 35 and the monitor 12 during retrace and for effecting selective blanking of the CRT of the display monitor 12 to provide the black band 28 in which the numerics 22-24 and 26 are displayed. The timer circuit 58 also provides a reference frequency of 3.58 MHz for the A/D converter 61 of the numeric generator circuit 57.

The power supply circuit 59 provides all the low voltage DC signals for the flying spot scanner 34 and the electronic circuits 32. In an exemplary embodiment, the power supply circuit 59 provides positive DC voltages at levels 30v, 12v and 5v, and negative DC voltages at levels 700v and 12v. Pushbuttons 8 (FIG. 1) enable selection of system supply voltages for display on the monitor 12. The level of the selected voltage is extended to the A/D converter 61 for use by the numeric generator circuit 63 to provide numeric video signals for display on the viewing screen 25 of the monitor 12 as numeric group 26 in a manner to be described.

The film analyzer unit 10 provided by the present invention, employs a flying spot scanner and dichroic mirrors to obtain colors separation, and solid state circuits for processing the video signals, thereby minimizing the size and weight of the unit. For example, the dimensions of a unit of the type described were 12 wide × 15 high × 35 inches deep, and the unit weighed 50 pounds.

T.V. Monitor

Figure 2:
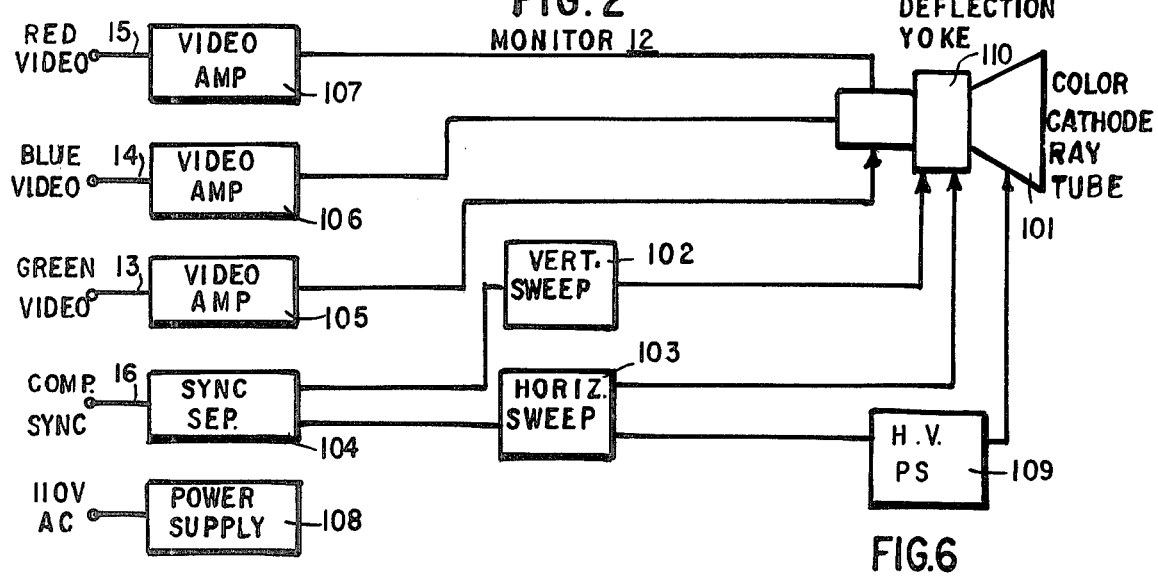
FIG. 2 is a block diagram of the monitor shown in FIG. 1.

Referring to FIG. 2, the color TV monitor 12 may be a standard R-G-B monitor, such as the Sony Trinitron Model, and includes a color CRT 101 which is driven by vertical and horizontal sweep circuits 102 and 103 under the control of sync pulses provided by a sync separator circuit 104. The CRT 101 contains three separate guns which provide simultaneous green, blue and red rasters of the picture under the control of the video color signals extended over conductors 13-15 as amplified by video amplifiers 105-107. The monitor 12 also includes a power supply circuit 108 which derives the low power supply voltages for the monitor 12 from 110 VAC. The monitor screen is 12 inches diagonally.

The sync separator circuit 104 is responsive to the composite sync signals provided over conductor 16 to separate the vertical and horizontal sync pulses from each other for the purpose of synchronizing the vertical sweep generator 102 and the horizontal sweep generator 103 which provide deflection waveforms to the deflection yoke 110 of the CRT 101. The horizontal sweep circuit 102 also drives a high voltage power supply 109 which provides 25kv to the anode of the CRT 101.

The video amplifiers 105-107 receive the video signals provided by the film analyzer unit 10 over conductors 13-15 which represent the color composition of the film 18 being analyzed and the numerics which are to be displayed to indicate the control settings, and provide drive signals to the guns of the CRT 101.

DETAILED DESCRIPTION

For the purpose of providing a better understanding of the invention, a more detailed description of the timer circuit 58, the computer section 50, the signal processor 57 and the brightness control 21 is now set forth.

Timer Circuit

Figure 5:
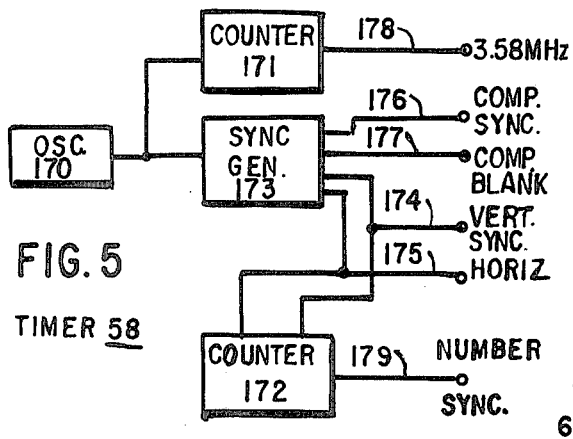
FIG. 5 is a block diagram of a timer circuit of the film analyzer.

A block diagram of the timer circuit 58 is shown in FIG. 5. The timer circuit 58 includes an oscillator 170, a pair of count down circuits 171 and 172, and a sync generator 173.

The oscillator 170 is a crystal controlled oscillator, such as the type commerically available from Vectron, as Model GO-231-8, which provides a 14.31 MHz drive signal for sync generator 173.

The sync generator 173, which may be the type commercially available from National Semiconductor as the Type MM5320, is driven by oscillator 170 to provide vertical and horizontal sync signals at outputs 174 and 175 which drive the vertical sweep generator 36 and the horizontal sweep generator 37 (FIG. 3). The sync generator 173 also provides a composite sync signal at output 176 which synchronizes the raster on the monitor 12 (FIG. 2). The sync generator 173 further provides a composite blanking signal at output 177 which is supplied to the computer circuits 51-53 for blanking the flying spot CRT 35 (FIG. 3) during the retrace of the beam.

The step down counters 171 and 172 may, for example, be the National Semiconductor Type 7493. The step down counter 171 is driven by the oscillator 170 to provide a signal output at a frequency of 3.58 MHz at output 178 for the analog-to-digital converter. The step down counter 172 responds to the vertical and horizontal sync signals provided at outputs 174 and 175 of the sync circuit 173 to generate a delayed pulse at output 179, which synchronizes the position of the numerics on the monitor screen 25, and enables the black bank 28 to be provided along the bottom portion of the monitor screen 25. The count down circuit 172 counts down the horizontal sync pulses from the time the vertical sync signal is provided and provides the number sync signal which is supplied to each of the computer circuits 51-53 as a numeric background blanking signal, and to the numeric generator circuit 63 to effect the start of generation of the numeric video signals at the proper time to enable display of the numerics 22-24 and 26 (FIG. 1) at the bottom of the monitor screen 25 and superimposed over a black background.

Computer Circuit

Referring to FIG. 4 there is shown a schematic circuit diagram for the computer circuit 51 which is associated with the green color channel. The two other computer circuits 52 and 53, which are associated with the blue and red color channels, respectively, are similar to computer circuit 54, and accordingly will not be described in detail.

In addition to the density control 76 and the color control 73, each of the computer circuits, such as computer circuit 51, includes a contrast control circuit 78 which is adjustable by the contrast control 85 (FIG. 1), a brightness control circuit 80 which is adjustable by the brightness control 95 (FIG. 1), and an output-mixer stage 82. The computer circuits also include a clamp circuit 84 and a blanking circuit 86.

Briefly, as the film 18 is scanned by the scanning apparatus 30, the green video signals provided at the output of video amplifier 56 and extended to an input 121 of the computer circuit 51 are supplied to the density control 76 and thence to the color control 73 which enable adjustment of the amplitude of the video signal representative of the color green and to be able to vary the signal relative to density of the color green in the picture displayed on the monitor 12.

As indicated above, the density control 76 includes a four-gang potentiometer, indicated by 122. A first section of the potentiometer 122a is connected in the video signal path for computer circuit 51 and has a wiper 123a, and second and third sections 122b–122c (FIG. 3) having wipers 123b and 123c connected in the video signal paths for computer circuits 52 and 53. The fourth section of the potentiometer 122d provides DC voltage at its wiper 123d, corresponding to control signal output A, which is indicative of the setting of the density control 76.

The density control 76, for computer circuit 51, further includes an emitter-follower amplifier including a transistor 131 having the density control potentiometer 122a connected in the emitter circuit of the transistor 131. The video color signals supplied to the computer circuit 51 are applied to the base of transistor 131 for driving the potentiometer 122a. The video signal output of the density control is taken at the wiper 123a of the potentiometer 122a. The section 122d of the potentiometer 122, which provides the variable DC signal, has its resistance portion connected between +5v and ground and its wiper 123d connected to output A.

The video signal provided at wiper 123a is applied to the base of a transistor 132 of the color control circuit 73, for computer circuit 51. The color control circuit 73 also includes a dual gang potentiometer 124 having a first section 124a with wiper 126a connected in the video signal path, and a second section 124b which provides a DC signal at its wiper 126b, which corresponds to control output B, which is indicative of the setting of the color control 73.

Transistor 132 is connected for operation as an emitter follower amplifier, having the color control potentiometer 124a connected in the emitter circuit of the transistor 132. The section 124b of the potentiometer 124 has its resistance portion connected between +5v and ground to provide a variable DC voltage at its wiper 126b which represents the setting of the green color control. Adjustment of the potentiometers 122 or 124 not only varies the amplitude of the video signal, but also the amplitude of the DC voltages which are provided to the signal processing circuit 57.

The video signals, after passing over the density and color controls are referenced to a positive DC level by the clamp circuit 84, and a reference source comprising a Zener diode 144, which provides a DC reference for the video signals that is the same for all three color channels. Each of the computer circuits 51–53 has its own clamp circuit, such as clamp circuit 84 for computer circuit 51, but the clamp circuits use a common DC reference source 144, the output of which is extended to circuits 52 and 53 over conductors 84' causing each computer circuit to have the same DC output reference.

The video signal which is provided at wiper 126a of the color control potentiometer 124 is extended to the base of a transistor 136, which is connected in emitter follower configuration, the emitter of which is coupled over a capacitor 138 to the base of a transistor 130 of the contrast control circuit 78, which is also controlled by an output of the clamp circuit 84.

The clamp circuit 84 includes a transistor 140 which receives the composite blanking signal provided by the timer circuit 58 over output 177 and which is coupled to the base of the transistor 140 over a coupling network 141 and a diode 142, the emitter of transistor 140 being connected to the reference voltage provided by the 15 volt Zener diode 144. The collector of transistor 140 is connected to the base of transistor 139.

Transistor 140, which is normally disabled, is enabled in response to the positive going blanking signal which controls the blanking circuit 86 to provide blanking for the monitor 12 during the blanking time of the CRT 35. At such time, the beam on the face of the CRT 35 is turned off and is being retraced to the start of the scan. When the potential at the base of transistor 140 goes more positive than the emitter, the collector of the transistor 140, and thus the base of transistor 139, are clamped to the positive reference voltage established at the emitter of transistor 140 by the Zener diode 144 as indicated by the waveform shown in FIG. 4. When the blanking pulse terminates, the video signal is released as shown by the waveform.

The resultant clamped video signal is applied to the base of transistor 139 of the contrast control circuit 78, which is connected in emitter-follower configuration, and has a contrast adjust potentiometer 145 connected in the emitter circuit thereof. Each computer circuit has an individual contrast control potentiometer, such as potentiometer 145 for circuit 51. However, the contrast control potentiometers are ganged, permitted control by the contrast control 85 on the control panel.

The signal output of the contrast control section 78, at the wiper 145a of potentiometer 145, having the wave form as illustrated thereat, is extended to the base of transistor 150, which is connected in emitter-follower configuration. The emitter of transistor 150 is connected over resistor 147 to point 149 and over parallel connected resistor 162 and capacitor 163 to the base of a transistor 164 of the output shaping circuit 82. The collector of transistor 150 is connected over a resistor 151 and a 15 volt Zener diode 152 to the 30 volt output of the power supply 59, which provides a voltage level of 15 volts to transistors 150 and 164 and to a resistor 168 of the brightness control circuit 80.

The amplifier emitter-follower 150 provides isolation between the contrast control potentiometer 145 and the output of the blanking circuit 86 which adds a blanking signal to the output signal at point 149.

The blanking circuit 86, includes a transistor 154 having its base connected over a resistor 155 to output 177 of the timer circuit 58 to receive the composite blanking signal, and over a resistor 156 to output 179 of the timer circuit 58 to receive the numeric blanking signal. The collector of transistor 154 is connected over a resistor 158 to point 149, and the emitter of transistor 154 is connected to ground.

When the composite blanking signal is provided at output 177 of the timer circuit 58, the positive signal causes transistor 154 to conduct, removing the portion of the video signal, which normally would go positive during blanking time, as indicated by the dotted line on the waveform illustrated, and adds a negative going component to the video signal as shown. The transistor 154 also responds to the positive numeric blanking signal provided over output 174, which is mixed into the base of transistor 154, to add the numeric blanking signal to the video signal to effect the creation of the black band 28 across the monitor screen 25 so that the numerics 22–24 and 26 will not be discolored by the video of the film being displayed.

The video signal, with blanking added is resistor mixed with a controlled DC voltage from the brightness control circuit 80 at the base of transistor 164, which controls the brightness of the picture on the monitor 12. The video signal at point 149 is extended to the base of transistor 164 over resistor 165 having its resistance portion connected between point 166 and ground, point 166 being connected over a resistor 167 to the base of transistor 164 and over a resistor 168 to Zener diode 152. Resistor 165 is adjustable by the brightness control 95 on the control panel to vary the DC voltage which is added to the video signal at the base of transistor 164 to provide brightness control. The potentiometer 165 provides a brightness contrl signal for all of the computer circuits 51–53, the signal at point 166 being extended to corresponding points in the other computer circuits 52 and 53 over conductor 165'. Thus, the same brightness control level is used for each of the computer circuits 51–53 to assure tracking of each of the circuits 51–53.

The video signal provided at the base of transistor 164, which is connected in emitter-follower configuration, is extended to output transistor 169 over a wave shaping network 180. The wave shaping network 180 includes a resistor 181 and an inductor 182, which are connected in parallel between the emitter of transistor 164 and the base of transistor 169, and a capacitor 183, which is connected between the collector of transistor 164 and the base of transistor 169. The wave shaping network 180 is used to decrease the rise and fall times of the video signal as applied to the base of transistor 169.

Transistor 169, which is connected in emitter-follower configuration, has its emitter connected to conductor 13, which extends the video signal representing the color green, to the monitor 12. The numeric video signal which effect the generation of the numeric 22 are mixed over diode 185 with the video color signal at the output of the computer circuit 51 to enable the numeric video signals to be extended to the monitor 12 over conductor 13.

Analog-to-Digital Converter

The analog-to-digital converter 61 converts the DC analog voltages which are provided at outputs A–D of the computer circuits 51–53 into digital signals which are used to control the numeric signal generator 63 which generates the numeric video signals.

Referring to FIG. 7, the A/D converter 61 includes four separate and identical circuits 61a–61d, one circuit 61b of which is shown in block diagram form in FIG. 7, which are used to generate serial digital data in relation to the level of the analog DC voltage supplied to inputs 61a'–61d' of the A/D circuits 61, such as input 61b' of circuit 61.

The A/D circuit 61b includes a pair of operational amplifiers 191 and 192 which form a differential input amplifier/comparator, providing signal isolation and start-stop commands to digital circuitry of the converter 61b.

One input 191a of amplifier 191 is connected to one of the variable signal outputs A–D, assumed to be the green color control output B. Amplifier 192 has an input 192a connected over a resistor 193 to reference potential, such as ground. The amplifiers 191 and 192 have respective inputs 191b and 192b connected to output 195a of a slope generator 194, including an operational amplifier 195 and a square wave generator 196, which provides a sawtooth waveform for driving the amplifiers 191 and 192 of the converter section, such as section 61b.

The amplifiers 191 and 192 have respective outputs connected to inputs of an exclusive "or" gate 198, which provides an output pulse, the duration of which varies with the difference in starting times of the signal outputs of amplifiers 191 and 192 level of the variable DC voltage supplied to amplifier 191. The output of gate 198 enables a gate 199 to pass the 3.58 MHz signal provided over output 178 by the timer 58 to the numeric signal generator 63 over output 202. The gate 100 receives a further enabling signal provided at output 196a of the square wave generator 196 which starts at the peak of the sawtooth wave and lasts for the duration of the fall time of the sawtooth signal. The output is also extended to a vertical sync gate 200 which gates a vertical sync pulse as a reset pulse over path 204 to the numeric signal generator 63 to start generation of the numerics.

The converter 61 employs the single slope method of analog-to-digital conversion which directly compares the command signal supplied to input 191a of amplifier 191 with the precision integrated reference sawtooth signal provided by slope generator 194. Each section of the A/D converter is similar to the Fairchild Model 32 digital voltmeter, with only the vertical sync gate 200 being added. The sawtooth waveform is provided at a 3Hz rate, with the peak of the waveform being synchronized with the occurrence of a vertical sync signal provided by timer 58, which is provided at a 60Hz rate.

The amplifiers 191 and 192 are driven by the sawtooth waveform, and during the fall time each amplifier is turned on when the decreasing level at inputs 191b and 192b goes below the level at inputs 191a and 192a. The signal outputs of the amplifiers 191 and 192, illustrated in FIG. 7, enable the exclusive "or" gate 198 to provide a signal corresponding to the difference in starting time of either signal. During such time gate 199 is enabled by the output of the square wave generator 196 which is triggered by a vertical sync pulse at the start of one raster. The width of the pulse output of gate 198 determines the time for which gate 199 is enabled, and thus the number of 3.58MHz pulses gated to the numeric signal generator 63 is related to the amplitude of the command signal. Accordingly, a series of pulses at a 3.58 MHz rate is extended over gate 199 to the numeric signal generator 63, with the number of pulses, as determined by the DC level analog input voltage, corresponding to that numeric to be displayed. Thus, when thirty pulses are provided, by circuit 61b, the numeric 22 will be thirty.

The A/D converter 61 further includes a slope control circuit 201, shown schematically in FIG. 7A. The slope control circuit 201 provides control signals to the three sections of the A/D converter 61 which receive the color control outputs provided at outputs B–D of the computer circuits 51–53. The slope control circuit 201 permits adjustment of the color numerics generated by the scanner in relation to density setting requirement, in effect providing a nonlinear output as a function of density.

Referring to FIG. 7B, which shows density versus exposure time for the colors red, blue and green for a given printing paper, it is seen that the color curves are not linear. Therefore, the same ratio of printing times is not required for each of the colors over the density range. The slope control circuit 201 enables the color numbers to increase or decrease with a change in the density input.

Referring to FIG. 7A, the slope control circuit 201 includes an emitter-follower amplifier including a transistor 203 which receives the density control signal provided over output A and drives three separate amplitude adjust potentiometers 205a–205c one per color channel. The wipers of the potentiometers 205a–205c are connected over respective two position switches 208a–208c to signal inputs of the operational amplifiers 191 and 192 of the A/D converter sections, such as section 61b shown in FIG. 7.

The density control voltage provided at output A is extended to the base of transistor 203 and coupled over the emitter-follower amplifier and a zero adjust control 207 to the three amplitude adjust potentiometers 205a–205c. The D.C. signal provided at the wipers of the potentiometers 205a–205c is extended to the input of either amplifier 191 or 192 depending on the setting of the switches 208a–208c. In the position illustrated, the switches 208a–208c connect the signal to the inputs 191a of the amplifiers 191 for each of the three A/D converter circuits to be added to the color control signals supplied to such inputs from outputs B-D of the computer circuits 51–53, causing the color numbers to increase with increased density input. With the switches 208a–208c operated to the other positions, the signal is extended to inputs 192a of the amplifiers 192 of the A/D circuits to be added to the reference level, and, in effect, be subtracted from color control signals supplied to the amplifiers 191, causing the color numbers to decrease with increased density input.

The flexibility of plus or minus control of each color enables control no matter what type of paper is used.

Numeric Signal Generator

The numeric signal generator 63, shown in block diagram form in FIG. 8, includes three identical number generators 211–213, which respond to the serial pulse trains provided by analog-to-digital circuits to generate numeric video signals for effecting the display of the color numerics 22–24, which comprise three two-digit numbers representing two settings of color controls 73–75 for green, blue and red, respectively. A further number generator 214, hereinafter referred to as the density number generator responds to a further serial pulse train to generate numeric video signals for effecting the display of the numerics 26, which comprise a three digit number representing the setting of the density control 76. As will be shown hereinafter, the numerics 26 may also display the peak value of either one of video color signals as selected by switch 64, or the levels of power supply voltages.

The number generator 211, hereinafter referred to as the green number generator, responds to a serial pulse train corresponding to the level of the command signal provided at output B of computer circuit 51, which controls the green video signals, to generate green numeric video signals. The green number generator 211 includes a counter 220, such as the Motorola Type MC14518CP which counts the pulses extended thereto from the A/D converter 61 and provides a BCD output which is extended over an inverter circuit 222, such as the National Semiconductor Type CM7406N to a number readout circuit 224. The number readout circuit 224, which is embodied as the National Semiconductor Type MM5841, TV channel number and time readout circuit, and an associated oscillator 226, which may be the type MM74C00N, commerically available from National Semiconductor, responds to the BCD outputs of the counter 220, as inverted by inverter 222, to provide video data signals for effecting the display of numerics 22.

The green numeric generator 211 receives the serial pulses from the A/D converter 61 which are supplied to counter 220 for conversion into a BCD code. The BCD coded signals which exit the counter 220 are amplified and inverted in polarity by inverter 222 and supplied to number readout circuit 224 which provides the necessary video information. The number readout circuit 224 receives positioning information to position the resultant video information on the monitor screen 25.

For the purpose of positioning the numeric video vertically down the screen, a number sync pulse is provided at output 179 of the timer circuit 58 (FIG. 5), and extended to each of the number readout circuits of number generators 211–214, such as number readout circuit 224. The number sync pulse, which is generated near the end of the sweep such as at line 450 for a 525 line raster generated by the vertical sweep circuit 102 of the monitor 12 (FIG. 2) causes all of the numerics 22–24 and 26 to be in a straight line across the screen 25.

Horizontal positioning of the numerics is controlled by adjusting external RC time constants of the number readout circuits by way of variable resistors, such as resistor 230 for number readout circuit 224, which controls the positioning of the numerics 22 on the screen 25.

The video information provided by number readout circuit 224 is extended over an emitter-follower amplifier 228 and a diode 185 to be mixed with the video signals provided at the output of computer circuit 51 (FIG. 4).

The blue number generator 212, and the red number generator 213 are identical to the green number generator 211. The blue number generator 212 receives a serial pulse train related to the level of the command signal provided at output C of computer circuit 52, and provides numeric video signals which are extended over a mixing diode 185' to conductor 14, at the output of computer circuit 52, to effect the display of the numerics 23 on the monitor screen 25.

The red number generator 213 receives a serial pulse train related to the level of the command signal provided at output D of computer circuit 53, and provides numeric video signals which are extended over a mixing diode 185" to conductor 15, at the output of computer circuit 53, to effect the display of the numerics 24 on the monitor screen 25.

The density numeric generator 214 is basically the same as the other numeric generators 211–213. However, since the numerics 26 comprise a three digit number, the numeric generator 214 employs two BCD counters 241 and 242 which drive separate number generators 243 and 244 over inverters 245 and 246, respectively. Number readout circuit 243, having an associated oscillator 247, is used to produce the first digit of numerics 26 and number readout circuit 244, having an associated oscillator 248, is used to generate the second and third digits of the numerics 26. The video outputs of the number readout circuits 243 and 244 are combined in a mixer 249 and extended over an emitter-follower amplifier 250 and three isolation diodes 251–253 to the outputs of the computer circuits 51–53, respectively, to be transmitted to the monitor 12 over respective conductors 13–15. Since the density numeric video signals are added to each of the color video signals supplied to the monitor 12 the resulting display of the density numerics 26 is white.

The number readout circuits 243 and 244 of the density numeric signal generator 214 also receive the number sync pulse provided by timer 58 which effects vertical positioning of the numerics 26. In addition, variable resistors 254 and 255, associated with number readout circuits 243 and 244, respectively, control positioning of the digits of the numerics 26.

The counters of each of the numeric signal generators 211–214, such as counter 220 for generator 211 and counters 241 and 242 for generator 214, are reset by a vertical sync pulse which is gated to the counters over gate 200 of the A/D converter (FIG. 7) when gate 200 is enabled by the output provided by square wave generator 196 at the peak of the sawtooth signal.

Peak Video Detection

Figure 6:
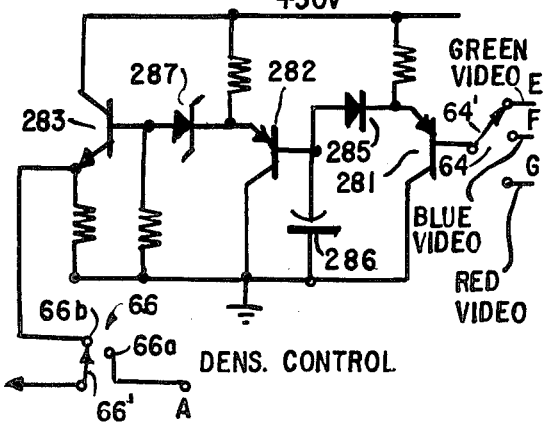
FIG. 6 is a schematic circuit diagram of a video peak detector of the film analyzer.

Referring to FIG. 6, there is shown a schematic circuit diagram of the peak video detector 60 which samples the video signals in the three signal channels. The peak video detector 60 includes three cascaded emitter-follower amplifier stages including transistors 281, 282 and 283. The base of transistor 281, which forms the input driver stage, is connected to the switch arm 64' of switch 64 which enables selection of either green, blue or red video signals which are provided at outputs E, F, and G, respectively of computer circuits 51, 52 and 53. The driver stage, including transistor 281 drives a peak detector comprised of a reverse connected diode 285 and a capacitor 286 supplying a peak rectified voltage to the base of transistor 282, which signal is DC level shifted by way of a Zener diode 287, which is connected between the emitter of transistor 282 and the base of transistor 283.

The resultant variable DC signal provided at the emitter of transistor 283 is extended over switch 66 to an input of the A/D converter 61, when switch arm 66' is operated to engage pole 66b, permitting the value of peak video signal selected by selector switch 64 measured by peak detector 60 to be displayed on the monitor 12 as numerics 26.

As indicated above, the video peak detector can be used to set up the density control for the computer section 60. This is done by selecting a density reading to which all the prints are to be printed. The density number is selected through the use of a standard negative. The standard negative placed in the film slot 18 and is scanned by the film scanning apparatus 30, enabling the computer section 50 to provide suitable video signals to the monitor 12. The operator operates switch 64 to select green video and then depresses switch 66 which causes the display of the DC peak detected video on number group 26, and operates the density control 76 until a pre-selected number is selected. If there is any black area in the picture, this will automatically setup the density control and green color control for the operator after which only blue and red color controls have to be adjusted to give the best coloring. It has also been found that generally the blue and red controls can also be setup using the very same method, which gives the operator the capability of operating the system with very little chance of making an error in selecting the control settings for each color.

Digressing, as indicated above, a numerical readout of the values of the power supply voltages can be provided by selectively extending the supply voltages to the numeric generator circuit 57. Referring to FIG. 3, the supply voltage to be displayed is selected by operating one of the pushbuttons 8 on the control panel (FIG. 1). Pushbuttons 8 are used to interrupt the density DC control voltage into the A/D converter 61, thereby displaying whatever one of voltages +5v, +12v, or +30v that requires testing in the system. Switches 8a–8c are normally closed, passing the density control voltage to the input of the A/D converter 61. When one of the switches, such as switch 8a, is operated, the 12vdc is extended to the A/D converter, providing pulses at a 3.58 MHz rate in the manner as described above, which controls the density numeric signal generator 214 to provide numeric video signals which are extended to the monitor and displayed as numerics 26. Potentiometers 289 are preset to enable the numeric values displayed to correspond to the amplitude of the selected voltage.

Brightness Control

Referring to FIG. 9, there is shown a schematic circuit diagram for the automatic brightness control circuit 21, which controls the brightness of the moving spot of light on the face of the flying spot CRT 35 (FIG. 3).

The brightness control circuit 21 includes an input amplifier 290, a driver amplifier 292, and an output amplifier 294. The input amplifier 290 includes a transistor 291 connected in emitter-follower configuration having a level adjust potentiometer 293 connected in the emitter circuit of the transistor 291. The base of transistor 291 is connected over a resistor 295 to the 30VDC output of the power supply 59, and to ground over photocell 27, which may be the Type TIL-65, commercially available from Texas Instruments. The resistors 295 and the photocell 26 form a voltage divider which provides a DC level at the base of transistor 291 related to the resistance of the photocell, and thus the brightness of the moving spot of light on the face of the CRT 35 (FIG. 3). The DC level at the base of transistor 291 in turn establishes the potential at the wiper 293a of the level control 293 which is connected in the emitter circuit of transistor 291.

The wiper 293a is connected over a resistor 297 to the base of transistor 295, which drives from its collector the base of transistor 298 over a resistor 299. The emitter of transistor 298 is connected to the 30VDC output of the power supply 59 and the collector of transistor 298 is connected over resistors 301–303 to a 300VDC output of the horizontal sweep circuit 37. A Zener diode 304 connected between the junction of resistors 302 and 303 at point 305 and ground provides a regulated DC voltage at 130VDC at point 305. The collector of transistor 298 is also connected over resistors 301 and 300 to the control grid of the flying spot CRT 35.

The photocell 27 is placed directly in front of the CRT 35 to detect light produced from the phospher on its face. The resistance of the photocell 27 changes with an increase or decrease in the light on the face of the CRT 35, causing the voltage at the base of transistor 291 to decrease or increase. Accordingly, a corresponding change occurs in the signal level at the emitter of transistor 291 and at the wiper 293a of the level adjust control 293.

The change in signal level at wiper 293a is amplified by transistors 295 and 298, and the amplified signal provided at the collector of transistor 298 is extended over resistors 301 and 300 to the control electrode of the CRT 35, causing the control electrode to go more negative, to decrease the intensity of the moving spot and to go more positive to increase the intensity of the moving spot in accordance with the level established by the level control 293. The automatic feedback provided by the brightness control circuit 21 maintains the light output of the CRT 35 constant.

Operation

To provide a better understanding of the manner in which the film analyzer unit 10 is used in evaluating a film, a brief description of the calibration and operation of the film analyzer unit 10 in an exemplary embodiment is now set forth.

Referring to FIGS. 1 and 3, when power is applied to the analyzer unit 10, by operation of a power switch (not shown), and to the monitor 12, the two-digit numerics, 22–24 which indicate the settings of the color controls 73–75, and the three digit numeric 26 which indicate the setting of the density control 76 are immediately displayed on the monitor screen 25. The density control 76 is then adjusted until the density numerics 26 read 70, which corresponds to the typical desired density level. Then the color controls 73–75 are individually adjusted to provide three readings of 30 for numerics 22–24 on the monitor screen 25.

For the purpose of calibrating the analyzer unit 10, a standard negative, such as the type commercially available from Eastman Kodak, is used. The standard negative is placed in the film slot 19 and scanned by the film scanning apparatus 30, which the operator reads the peak video signals in the three computer sections 51–53, enabling the density and color controls to be set to compensate for possible changes in the operating parameters of the analyzer unit 10.

More specifically with the standard negative in the film slot 19, the density and color content of the standard negative are such that the color numerics 22–24 should read 30 and the density numerics 26 should read 70. To set the analyzer unit 10 to provide the selected density reading 70, the operator first operates switch 9f to connect potentiometers 54′–56′ into the gain circuits of amplifiers 54–56. Then he operates switch 64 to extend the green video signals, provided at output E of the computer circuit 51, to the peak detector 60, and then depresses switch 66 to connect the output of the peak detector 60 to the input of the A/D converter 61. This causes the peak value of the green video signals to be displayed as numerics 26. If the value is not 70, the gain control 91 is adjusted until a reading of 70 is obtained.

The above process is then repeated, selecting first the blue video signals and adjusting potentiometer 55′ if necessary, and then selecting the red video signals and adjusting gain control 93 if necessary so that the peak values of the green, blue and red video signals are displayed as the value 70. When switch 66 is released, the density reading displayed as numerics 26 will be 70, and the color levels displayed as numerics 22–25 will each read 30. The analyzer unit 10 has now been calibrated, and the density and color controls have been set as reference levels desired for a standard negative for use in measuring the color and density values of an unknown film.

To obtain the proper printer settings for an unknown film to be printed, the film is placed in the film slot 19 to be scanned by the film scanning apparatus 30. The film select switch 9e–9e corresponding to the film type used, such as for example Kodak types Ectachrome II, VPS, KX, CII or FII, is depressed to select the gains for the video amplifiers 54–56. Alternatively, switch 9f may be operated to set the amplifier gains at the reference levels established by potentiometers 54′–56′.

The density setting for the unknown film is obtained by switching one of the green, blue or red video signals, such as the red video signal, through the peak detector 60 over switch 64, and over switch 66 to the A/D converter 61 to effect the display of the peak value of the selected video signal on the monitor 12 as numerics 26. The density control 76 is adjusted until the peak value displayed is 70. When switch 66 is released, the density number displayed as numeric 26 is the number for use in setting the printer.

The green and blue color controls 73–74 are then set by extending the green and blue video signals separately to the A/D converter 61 over the peak detector 61 to display the peak values as numerics 26, and adjusting the individual color controls 73 and 74 to provide the same readings (70 in the present example) for each color.

Alternatively, the operator can view the picture on the monitor 12 and adjust the density and color controls until the desired density and color balance is visually obtained.

The color control settings may then be read from numerics 22–24. The resultant color and density settings displayed as numerics 22–24 and 26 are then recorded for use in setting up the printer (not shown). One example of a commercially available printer suitable for this purpose is the Model ACSM 58 Miniprinter, commercially available from Durst Ltd. of Surry, England.

It is pointed out that the analyzer unit 10 is best used in a room having controlled light. The contrast control 78 may be adjusted by knob 85, and the brightness control 80 may be adjusted by knob 95 to modify the brightness and contrast of the viewed picture as desired by the operator.

It should be understood that the numerical display as provided by the film analyzer unit 10 is used with the different types of commercially available printing apparatus by relating the numeric outputs to the printer settings through the use of a simple conversion chart such as presently used in the field.

I claim:

1. In a color film analyzer for processing color films, film scanning means for scanning a film and providing separate color signals representative of each of a plurality of different colors of the film, reference means for deriving reference levels from the color signals provided while a standard film is being scanned, said reference means including register means for registering said reference levels for use in the processing of unknown films thereafter, and control means including adjustable means for adjusting the color signals provided while an unknown film is being scanned to said reference levels.

2. A film analyzer as set forth in claim 1 wherein said film scanning means includes flying spot scanner means for projecting a moving beam of light through the film being scanned, light separation means including reflecting means having a plurality of dichroic mirrors, means for directing the light beam projected through the film being scanned to said reflecting means for separating said light beam into a plurality of color components, and photomultiplier means responsive to the color components of said light beam to provide video signals representative of the colors of the film being scanned.

3. A film analyzer as set forth in claim 1 wherein said film scanning means includes circuit means for providing color video signals over separate signal channels, said register means including further adjustable means for each signal channel to provide a reference level for each signal channel which is determined by the value of the color signals provided while a standard film is being scanned.

4. In a color film analyzer for processing films, means for providing separate color signals representative of each of a plurality of different colors of a standard film and means for deriving reference signals from said color signals including register means for registering said reference signals for use in the processing of unknown films thereafter, said reference signals being predetermined for different known types of film, and said register means including switch means for selecting predetermined reference signals whenever one of said known films is processed.

5. In a color film analyzer for processing films, means for providing separate color signals representative of each of a plurality of different colors of a standard film, and means for deriving reference signals from said color signals including register means for registering said reference signals for use in the processing of unknown films thereafter, and means for providing numeric signals related to the values of said color signals for controlling a display apparatus to provide a visual display of said values.

6. In a color film analyzer for processing films, means for providing color video signals over separate signal channels representative of each of a plurality of different colors of a standard film, means for deriving reference signals from said color signals including register means for registering said reference signals for use in the processing of unknown films thereafter, said register means including adjustable means for each channel to provide a reference signal for each channel which is determined by the value of the color signals, and control means for modifying color signals provided over said signal channels as adjusted by said reference signals while an unknown film is being processed to adjust the color signals in correspondence with reference values.

7. A film analyzer as set forth in claim 6 wherein said control means includes density control means common to all of said signal channels and a plurality of color control means each individually associated with a different one of said signal channels.

8. In a video color film analyzer for effecting the display of a video reproduction of a film on a monitor, film scanning means including flying spot scanner means for projecting a moving beam of light through said film, light separation means including reflecting means having at least first and second dichroic mirrors, means for directing the light beam projected through said film to said reflecting means for separating said light beam into red, blue, and green components, and photomultiplier means responsive to the red, blue and green components of said light beam to provide separate video signals related to the red, blue and green components of the light beam, and computer means for extending said color video signals to said monitor.

9. A film analyzer as set forth in claim 8 wherein said means for directing the light beam comprises a collimating lens interposed between said film and said reflecting means, and wherein said photomultiplier means includes first, second and third sections, one of said dichroic mirrors reflecting the red component of said light beam to said first photomultiplier section, a second one of said dichroic mirrors reflecting the blue component of said light beam to said second photomultiplier section, and said reflecting means further including a front surface mirror for reflecting the green component of said light beam to said third photomultiplier section.

10. In a video color film analyzer for effecting the display of a video color reproduction of a film on the screen of a video monitor, film scanning means for scanning the film and providing color video signals related to the red, blue and green colors of the film, computer means for extending said color video signals to said monitor and for providing outputs related to said video signals, and numeric processor means responsive to said outputs for effecting the display on said monitor of numerics which indicate the density and color of the film.

11. A film analyzer as set forth in claim 10 wherein said numeric processor means includes numeric signal generating means for generating numeric video signals corresponding to the green, blue and red color levels of said film, and output means for transmitting each of the numeric video signals to said monitor with the related one of said color video signals to cause the numerics indicating the green, blue and red color levels to be displayed in the corresponding colors, said numeric signal generating means generating further numeric video signals corresponding to the color density of the film, said output means transmitting said further numeric video signals to said monitor with each of said color video signals to cause the numerics indicating the color density to be displayed in white.

12. A film analyzer as set forth in claim 11 including means for controlling the vertical and horizontal positioning of said numerics on the monitor screen, and means for causing the numerics to be displayed on a black band on said monitor screen.

13. In a color film analyzer for processing color films, first means including film scanning means for scanning a film and providing color video signals over separate signal channels representative of the colors of the film, second means for detecting and measuring the video signals in each of said signal channels and for providing control signals related to said video signals, and third means responsive to said control signals for providing outputs representative of the values of the video signals measured, said first means including adjustable means in each signal channel for adjusting the color video signals provided while a standard film is being processed to establish outputs at reference values for use in the processing of unknown films, and said first means further including control means having further adjustable means for adjusting the color video signals provided over said signal channels while an unknown film is being processed to establish outputs representative of the values of said video signals which correspond to said reference values.

14. In a color film analyzer for processing color films, first means for providing color video signals over separate signal channels representative of the colors of the film, second means for detecting and measuring the video signals in each of said signal channels and for providing control signals related to said video signals, and third means responsive to said control signals for providing outputs representative of the values of the video signals measured, said first means including a plurality of video amplifiers each connected in a different one of said signal channels, select means operable to enable the video signal in each signal channel to be individually selected and extended to said second means to effect the display on a video monitor of numerics related to the selected video signal, and gain adjust means for permitting individual adjustment of the gains of the video amplifiers selected while a standard film is being processed, whereby as the video signal in a given signal channel is selected, the gain of the corresponding video amplifier may be adjusted to cause the displayed numerics to indicate a preselected value for the selected video signal, thereby providing at least a density value for use in processing unknown films.

15. A film analyzer as set forth in claim 14 which includes density control means common to all of said signal channels and adjustable to modify the video signals in all of said signal channels, and a separate color control means for each signal channel, each individually adjustable to modify the video signal in the corresponding signal channel, said density control means being adjusted while an unknown film is being scanned, and while the video signal in one of said signal channels is selected, to cause the displayed numerics to indicate one of said density values, and the color control means associated with the other signal channels being adjusted while said unknown film is being processed to cause the displayed numerics to indicate density and color information for use in obtaining a print reproduction of the unknown film.

16. In a video color film analyzer for effecting the display of a video color reproduction of a film on a video monitor, film scanning means for scanning the film and providing separate color video signals related in amplitude to the green, blue and red color composition of the film, computer means having a plurality of computer circuits for extending said color video signals to the monitor over separate signal channels to effect the display of a reproduction of the film, density control means having first means adjustable to different settings to modify the color video signals extended over said signal channels to thereby vary the color density of the reproduction displayed on the monitor, and second means for providing a density signal related to the setting of said first means and a plurality of color control means, each individually associated with a different one of said signal channels, and each having third means being adjustable to different settings to vary the color balance of the reproduction displayed on the monitor, and fourth means for providing a color signal related to the setting of said third means, and processor means including analog-to-digital converter means responsive to said density and color signals to provide a plurality of digital outputs each corresponding to the amplitude of a different one of said signals, and numeric generating means responsive to the digital signal outputs of said converter means to provide numeric video signals to effect the display on said monitor of density numerics indicating the setting of the density control means and color numerics indicating the settings of said plurality of color control means.

17. A film analyzer as set forth in claim 16 wherein said converter means includes means responsive to said density signal and said color signals to cause a nonlinear change in the color numerics with a linear change in the density signal.

18. A film analyzer as set forth in claim 16 wherein said processor means further includes video peak detector means, and select means for permitting the color video signals in each of said signal channels to be selectively extended to said peak detector means, said peak detector means providing an output signal related to the amplitude of the selected video signal for application to said converter means to enable said numeric generating means to provide numeric video signals representing the amplitude of the selected video signal for application to said monitor.

19. A film analyzer as set forth in claim 16 which includes power supply means for providing operating voltages for said film analyzer, and means for selectively extending the operating voltages to said converter means to effect the generation of numeric video signals representing the levels of said operating voltages for application to said monitor.

20. A film analyzer as set forth in claim 16 wherein said computer means includes reference means operable to provide a common DC reference level for the video signals in each of said signal channels.

21. A method for evaluating color films prior to printing, said method comprising sampling a standard film to obtain color signals related in value to the different colors of a standard film, deriving reference values from the color signals for use in processing unknown films, sampling an unknown film to obtain further color signals related to the colors of the unknown film, and using the reference values to adjust the further color signals.

22. A method for evaluating color films prior to printing, said method comprising scanning a standard film to provide separate color signals representing the red, blue and green colors of the standard film over separate signal channels, sampling the color signals in each signal channel, monitoring the signal samples on a display means and establishing reference levels in each signal channel at a common reference value, scanning an unknown film to provide separate color signals representing the red, blue and green colors of the unknown film over said separate signal channels, sampling the color signal in one of said signal channels, monitoring the signal sample on said display means and adjusting the signal levels in all of said channels until the monitored signal sample is at said reference value, and thereafter individually sampling the color signals in the other ones of said signal channels, monitoring the signal sample on said display means and adjusting the signal level in the corresponding signal channel until the monitored signal sample is at said reference value.

23. In a video color film analyzer, film scanning means for scanning a film and providing separate color video signals related in amplitude to the green, blue and red color composition of the film, a color video monitor, and circuit means for extending said color video signals to said video monitor over separate signal channels to separate inputs of said video monitor to effect the display of a reproduction of the film on said video monitor.

24. A film analyzer as set forth in claim 23 wherein said color video monitor includes a color cathode ray tube having separate guns which provide simultaneous green, blue and red rasters of a picture provided by the color tube, under the control of the separate color video signals extended to said color video monitor.

25. A method for evaluating color films prior to printing, said method comprising scanning a standard film to provide separate color signals representing the red, blue and green colors of the standard film over separate signal channels, adjusting the levels of the color signals in each signal channel to a common reference value, scanning an unknown film to provide separate color signals representing the red, blue and green colors of the unknown film over said separate signal channels, and adjusting the signal levels in said signal channels to said reference value.

* * * * *